(12) United States Patent
Stock

(10) Patent No.: US 12,151,501 B2
(45) Date of Patent: Nov. 26, 2024

(54) METHOD FOR PRODUCING A LUMINESCENT SECURITY MARKING AND LUMINESCENT SECURITY MARKING

(71) Applicant: GIESECKE+DEVRIENT CURRENCY TECHNOLOGY GMBH, Munich (DE)

(72) Inventor: Kai Uwe Stock, Grunwald (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/564,503

(22) PCT Filed: May 25, 2022

(86) PCT No.: PCT/EP2022/025243
§ 371 (c)(1),
(2) Date: Nov. 27, 2023

(87) PCT Pub. No.: WO2022/248080
PCT Pub. Date: Dec. 1, 2022

(65) Prior Publication Data
US 2024/0181799 A1    Jun. 6, 2024

(30) Foreign Application Priority Data

May 27, 2021    (DE) .................. 10 2021 002 759.0

(51) Int. Cl.
*B42D 25/45*    (2014.01)
*B41M 3/14*    (2006.01)
(Continued)

(52) U.S. Cl.
CPC ............. *B42D 25/45* (2014.10); *B41M 3/144* (2013.01); *B42D 25/29* (2014.10); *B42D 25/378* (2014.10)

(58) Field of Classification Search
CPC ...... B42D 25/45; B42D 25/29; B42D 25/378; B41M 3/144
See application file for complete search history.

(56) References Cited

U.S. PATENT DOCUMENTS

2022/0305837 A1    9/2022    Schmitz et al.

FOREIGN PATENT DOCUMENTS

DE    102010062032 A1    5/2012
DE    102019004229 A1    12/2020
(Continued)

OTHER PUBLICATIONS

International Search Report from corresponding PCT Application No. PCT/EP2022/025243, Oct. 4, 2022.
(Continued)

*Primary Examiner* — Rebecca C Bryant
(74) *Attorney, Agent, or Firm* — Workman Nydegger

(57) ABSTRACT

A method is provided for producing a luminescent security marking on a substrate of a predetermined substrate type. The security marking includes a layer sequence applied on top of the substrate in a part region and formed from a diffuse reflectance printing ink applied on top of the substrate and from a luminescent printing ink applied on top of the diffuse reflectance printing ink, or a mixture of a diffuse reflectance printing ink and a luminescent printing ink. The layer sequence or the mixture exhibit visible luminescence after excitation. The layer sequence or the mixture are printed with a chosen layer thickness onto a substrate of the predetermined substrate type, in order to obtain a luminescent security marking, the luminescent spectrum of which matches the calculated combination spectrum in the part region on illumination with the excitation light. The invention also relates to an associated luminescent security marking.

17 Claims, 6 Drawing Sheets

(51) Int. Cl.
*B42D 25/29* (2014.01)
*B42D 25/378* (2014.01)

(56) References Cited

FOREIGN PATENT DOCUMENTS

| | | |
|---|---|---|
| DE | 102019008116 A1 | 5/2021 |
| DE | 102020209013 A1 | 1/2022 |
| EP | 3225417 A1 | 10/2017 |
| EP | 3825141 A2 | 5/2021 |
| WO | 2008129416 A2 | 10/2008 |
| WO | 2018206936 A1 | 11/2018 |

OTHER PUBLICATIONS

German Search Report from corresponding DE Application No. 102021002759.0, Feb. 14, 2022.

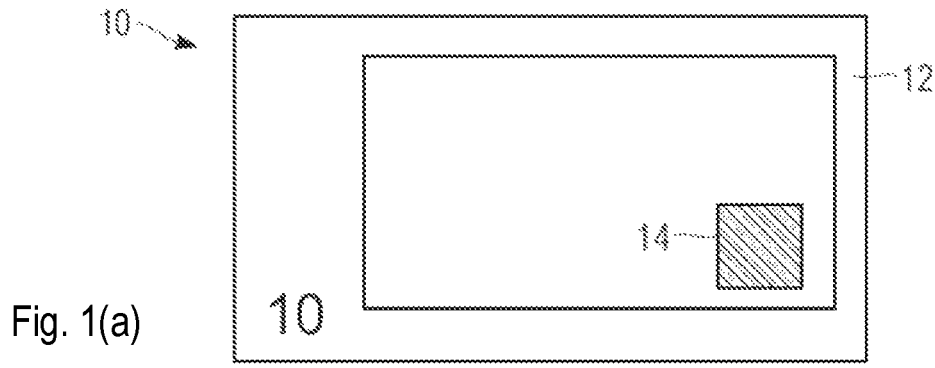
Fig. 1(a)
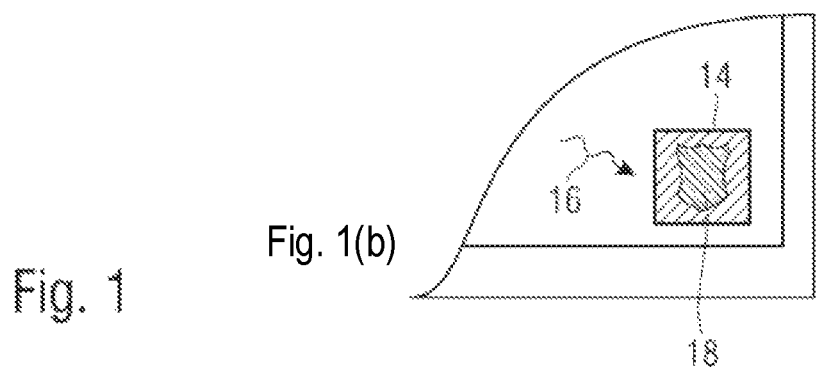
Fig. 1(b)
Fig. 1
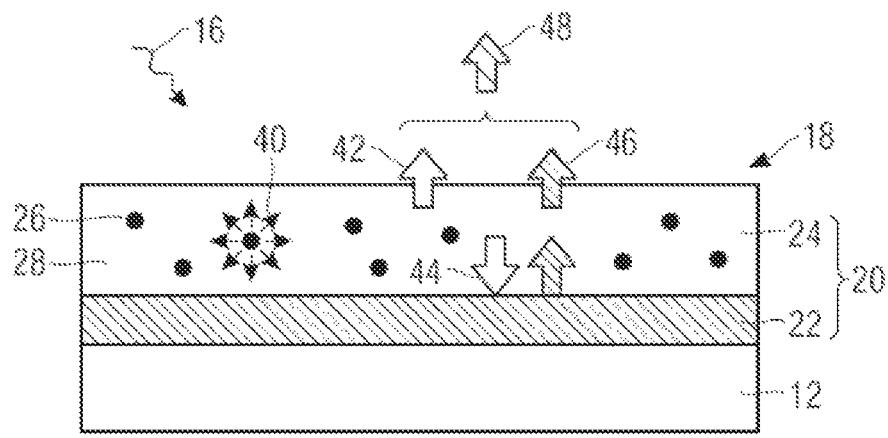
Fig. 2

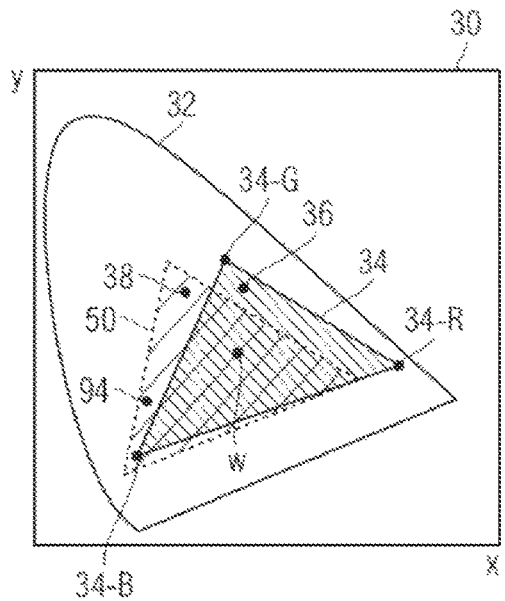
Fig. 3
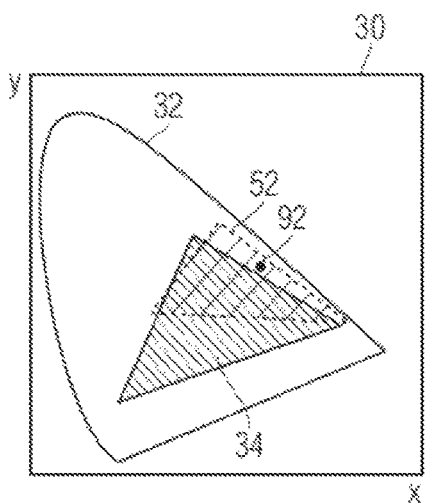
Fig. 4(a)
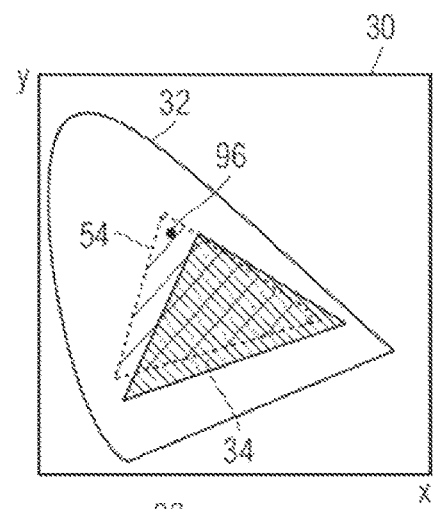
Fig. 4(b)
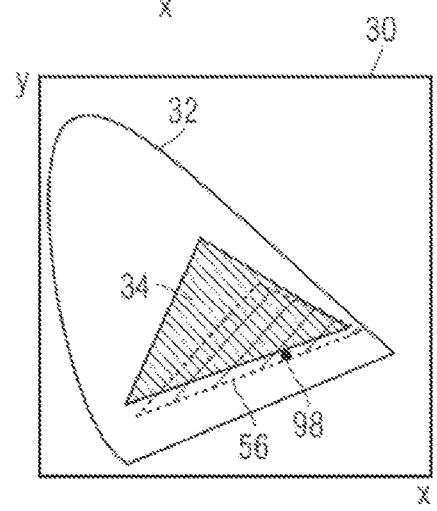
Fig. 4(c)
Fig. 4

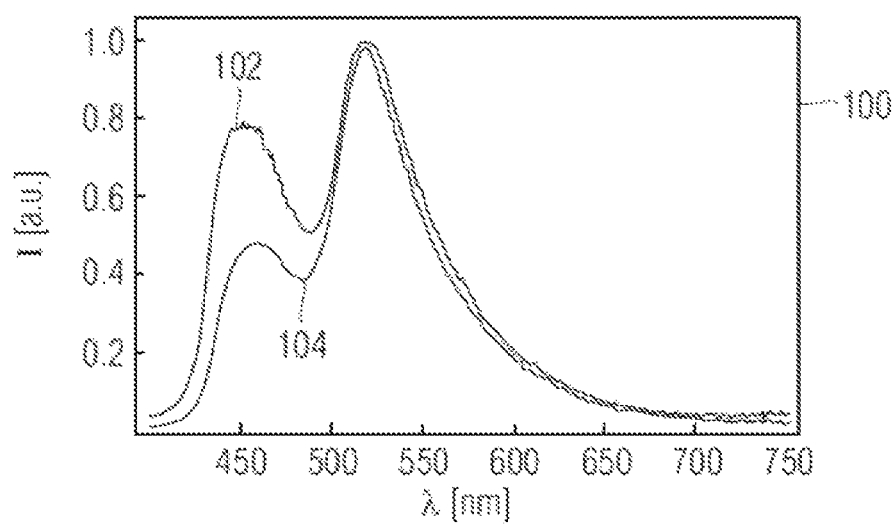
Fig. 7(a)
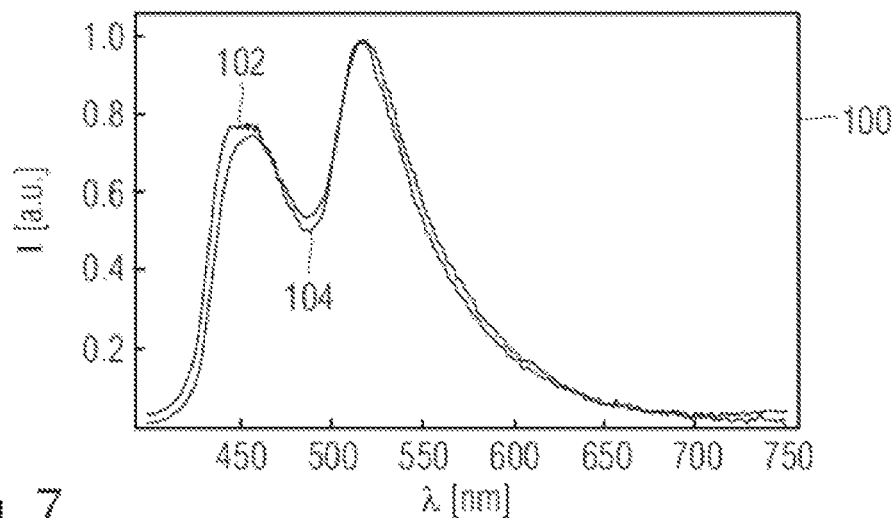
Fig. 7(b)
Fig. 7
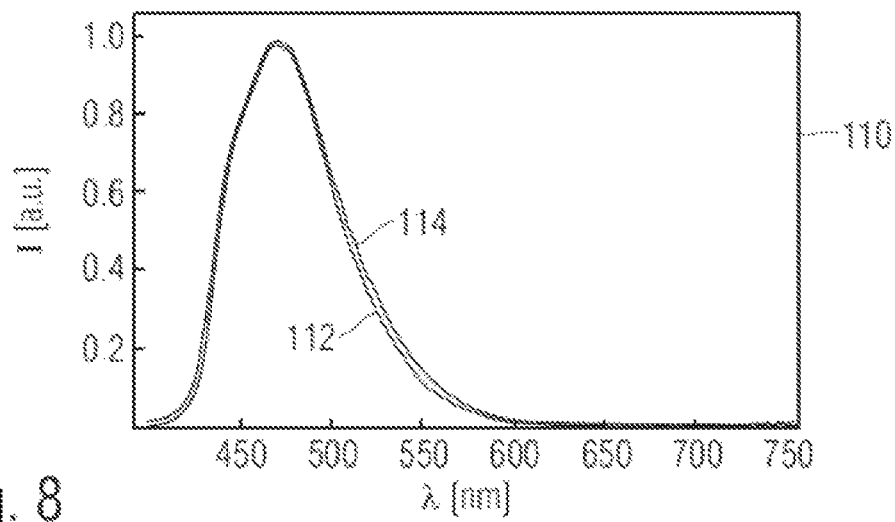
Fig. 8(a)
Fig. 8

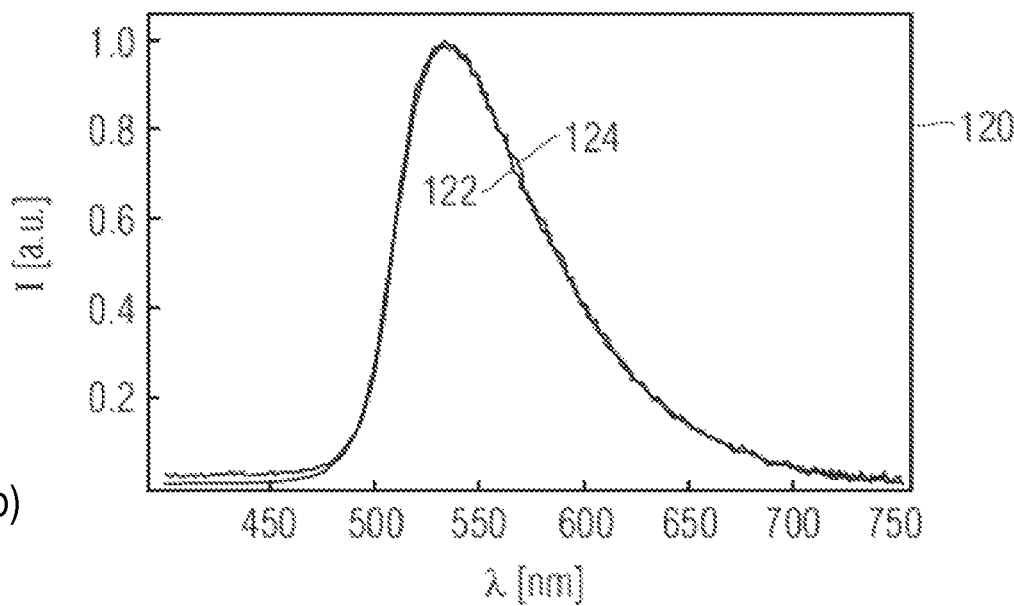
Fig. 8(b)
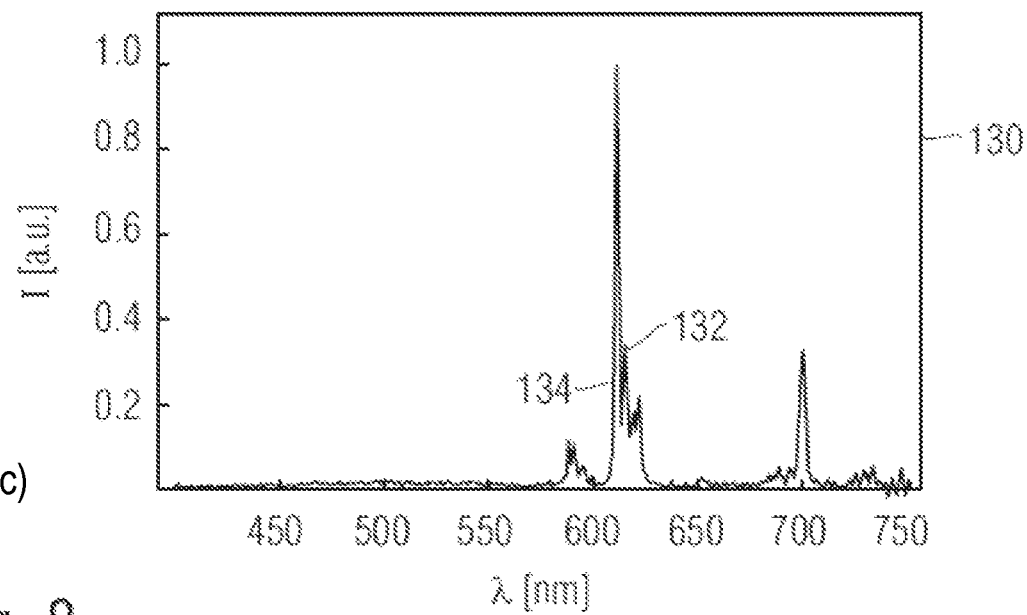
Fig. 8(c)
Fig. 8

# METHOD FOR PRODUCING A LUMINESCENT SECURITY MARKING AND LUMINESCENT SECURITY MARKING

BACKGROUND

The invention relates to methods for producing a luminescent security marking, and to a luminescent security marking produced by such methods. In particular, the security marking can form a security element for securing a data carrier, such as a document of value or an identification document.

Data carriers, such as documents of value or identification documents, but also other valuable items, such as branded articles, are often provided with security elements for protection purposes, which allow the authenticity of the data carriers to be verified and which also serve as protection against unauthorized reproduction. In this context, it is known to use luminescent substances as security markings to secure documents of value or identity documents. The presence of the luminescent substances can then be checked using a UV lamp, for example.

Multicolor or even photorealistic luminescent prints are perceived as particularly attractive for authentication. To produce such prints, two or more luminescent base printing inks with different color effects are usually used, and desired mixed colors in luminescent emission are obtained by mixing, overprinting or halftone printing these luminescent base printing inks. However, with a given set of luminescent base printing inks, for example base printing inks for a red, green and blue luminescence, only those mixed colors can be produced whose color locations in the color space lie within the color triangle spanned by the three basic colors. To change or increase this gamut, other luminescent base printing inks can be used. However, the luminescent base printing inks must meet numerous requirements for possible use in luminescent security markings, for example with regard to their chemical stability, lightfastness, chemical harmlessness, miscibility and brightness. Finding and developing suitable new luminescent base printing inks is therefore time-consuming and expensive.

SUMMARY

On this basis, the invention is based on the task of providing methods of the type mentioned at the beginning, with which luminescent security markings with color locations outside the previously available gamut can be produced in a relatively simple and cost-effective manner. The invention also seeks to provide a luminescent security marking that can be produced or manufactured by a method.

In a first aspect, the invention relates to a method for producing a luminescent security marking on a substrate of a predetermined substrate type, which comprises, in a part region, a layer sequence applied to the substrate, formed from a diffuse reflectance printing ink applied to the substrate and a luminescent printing ink applied at the diffuse reflectance printing ink, and which exhibits visible luminescence with a luminescent spectrum on illumination with non-visible excitation light.

In the method, a diffuse reflectance layer thickness and a luminescent layer thickness are selected in a step WS), and a diffuse reflectance printing ink and a luminescent printing ink are selected in a step WF).

In a step C), a division parameter c is provided from the interval [0,1], the value of which depends on the predetermined substrate type, the selected diffuse reflectance layer thickness, and the selected luminescent layer thickness.

In a step B), a combination spectrum is determined by adding the luminescent spectrum of the luminescent printing ink modified by the diffuse reflectance spectrum $S_{Rem}$ of the diffuse reflectance printing ink and the unmodified luminescent spectrum $S_{Lum}$ of the luminescent printing ink, weighted by the provided division parameter c.

In a step D), the selected diffuse reflectance printing ink with the selected diffuse reflectance layer thickness and the selected luminescent printing ink with the selected luminescent layer thickness are printed on a substrate of the predetermined substrate type to obtain a luminescent security marking on the substrate whose v spectrum in the part region on illumination with the non-visible excitation light matches the combination spectrum calculated in step B).

In this context, layer thickness is understood to mean in particular the weight per unit area (e.g., 1 g/m$^2$) affected by printing ink. This preferably applies to the printing of both paper samples and film samples. For film samples, the layer thickness (equivalent to the above description) can be understood as the applied ink layer thickness—this can be converted into a basis weight based on the density. In this case, the same area coverage (e.g., solid, 50% halftone, etc.) is used in step D when printing the selected diffuse reflectance printing ink as when measuring the diffuse reflectance spectrum used in step B, and the same area coverage is used when printing the selected luminescent printing ink as when measuring the luminescent spectrum used in step B.

Non-visible excitation light in the context of this description means light outside the visible spectral range from 380 nm to 780 nm, specifically in particular UV light in the spectral range from 10 nm to 380 nm, preferably from 200 nm to 380 nm, or IR light in the spectral range from 780 nm to 30 μm, preferably from 780 nm to 3000 nm. In particular, UV excitation can be performed in the long-wave UV at an excitation wavelength of 365 nm or in the short-wave UV at an excitation wavelength of 254 nm.

In the context of this description, the term luminescence comprises in particular phosphorescence and fluorescence, wherein the excitation of luminescence takes place with the aforementioned, non-visible excitation light.

In an advantageous method, in step B) the combination spectrum $S_{tot}$ is calculated by means of the equation $$S_{tot} = c \times S_{Lum} \times S_{Rem} + (1-c) \times S_{Lum}$$

wherein c is the division parameter, $S_{Lum}$ is the luminescent spectrum of the luminescent printing ink, and $S_{Rem}$ is the diffuse reflectance spectrum of the diffuse reflectance printing ink, and wherein the term $S_{Lum} \times S_{Rem}$ represents the above luminescent spectrum of the luminescent printing ink modified by the diffuse reflectance spectrum $S_{Rem}$ of the diffuse reflectance printing ink, and the term $S_{Lum}$ represents the above unmodified luminescent spectrum of the luminescent printing ink. This allows easy and accurate calculation of the combination spectrum.

Advantageously, in step B), the diffuse reflectance spectrum $S_{Rem}$ of the diffuse reflectance printing ink is determined by
  producing a sample print with the selected diffuse reflectance printing ink with the selected diffuse reflectance layer thickness on a substrate of the predetermined substrate type,
  measuring the diffuse reflectance spectrum of the sample print, and
  using the measured diffuse reflectance spectrum of the sample print as the diffuse reflectance spectrum $S_{Rem}$.

In this way, a possible influence of a colored substrate can be taken into account.

A diffuse reflectance spectrum can be recorded, for example, by a spectrophotometric measurement. Spectrophotometers split the visible light spectrum into a number of narrow bands or measurement channels, for example 20 to 40 bands about 20 to 10 nm wide, and provide a digitized luminous intensity value for each channel. If the diffuse reflectance of a sample is measured after calibration to white and black standards independent of the illumination source used in the spectrophotometer, a diffuse reflectance spectrum can be determined from these measured values for the measured sample.

Further, advantageously, in step B), the luminescent spectrum $S_{Lum}$ of the luminescent printing ink is determined by
producing a sample print with the selected luminescent printing ink having the selected luminescent layer thickness on a substrate of the predetermined substrate type,
measuring the luminescent spectrum of the sample print on illumination with the excitation light, and
using the measured luminescent spectrum of the sample print as the luminescent spectrum $S_{Lum}$.

In a preferred method execution, in step C) a division parameter is provided, the value of which depends only on the predetermined substrate, the chosen diffuse reflectance layer thickness and the chosen luminescent layer thickness, but not on the chosen diffuse reflectance printing ink and the chosen luminescent printing ink. This allows easy application of the method for various selected diffuse reflectance and luminescent printing inks.

According to a further development of the invention, in step C) the division parameter c is provided by
C1) selecting a sample diffuse reflectance printing ink and a sample luminescent printing ink, preferably with complementary color impressions of luminescence and diffuse reflectance, respectively,
C2) producing a first sample print on a substrate of the predetermined substrate type with the selected sample diffuse reflectance printing ink with the selected diffuse reflectance layer thickness,
C3) measuring the diffuse reflectance spectrum of the first sample print,
C4) producing a second sample print on a substrate of the predetermined substrate type with the selected sample luminescent printing ink having the selected luminescent layer thickness,
C5) measuring the luminescent spectrum of the second sample print on illumination with the non-visible excitation light,
C6) producing a third sample print on a substrate of the predetermined substrate type, by printing on the substrate the selected sample diffuse reflectance printing ink having the selected diffuse reflectance layer thickness, and by printing on the sample diffuse reflectance printing ink the selected sample luminescent printing ink having the selected luminescent layer thickness,
C7) measuring the emission spectrum of the third sample print on illumination with the non-visible excitation light, and
C8) determining the division parameter c using the measured diffuse reflectance spectrum of the first sample print, the measured luminescent spectrum of the second sample print and the measured emission spectrum of the third sample print.

In this way, a division parameter c can be determined with little effort, which can then be used for combinations of any diffuse reflectance and luminescent printing inks. For an even more precise determination of the division parameter c, this can be determined several times for different combinations of sample diffuse reflectance ink and sample luminescent color and the values obtained combined, in particular averaged.

In step C8), the division parameter c is advantageously determined by
C8a) calculating a sample combination spectrum assuming an initial value for the division parameter by weighted addition of the measured luminescent spectrum modified by the measured diffuse reflectance spectrum and the unmodified measured luminescent spectrum and comparing it with the measured emission spectrum, and
C8b) adjusting the initial value of the division parameter c, if necessary several times, in such a way that the calculated sample combination spectrum has the best possible agreement with the measured emission spectrum.

This allows a particularly accurate determination of the division parameter c.

Preferably, the sample combination spectrum $SP_{tot}$ is calculated by means of the equation $$SP_{tot} = c0 \times SM_{Lum} \times SM_{Rem} + (1-c0) \times SM_{Lum},$$

wherein c0 represents the initial value or an adjusted initial value for the division parameter, $SM_{Lum}$ represents the measured luminescent spectrum, and $SM_{Rem}$ represents the measured diffuse reflectance spectrum.

For the comparison of the combination spectrum with the measured emission spectrum, a distance dimension between the calculated sample combination spectrum $SP_{tot}$ and the measured emission spectrum $SM_{Em}$ is advantageously calculated. For example, the distance dimension calculated is the difference between the product of the integrals of $SP_{tot}$ and $SM_{Em}$, and the integral of the product of $SP_{tot}$ and $SM_{Em}$, each as a function of wavelength over the visible spectral range. Alternatively, the Euclidean norm of the difference vector can be used as a distance dimension, which results when $SP_{tot}$ and $SM_{Em}$ are taken as vectors and the unit vector in direction $SP_{tot}$ is subtracted from the unit vector in direction $SM_{Em}$. If necessary, the initial value c0 is adjusted several times to determine the division parameter c in such a way that the calculated distance dimension is minimized. This allows automated determination of the division parameter with good accuracy.

More precisely, for example, a value c0=0.5 can be predetermined as the initial value for the division parameter. With this initial value, a sample combination spectrum $SP_{tot}$(c0) is calculated and compared to the measured emission spectrum using a distance dimension. For example, a well-suited distance dimension represents the difference between the product of the integrals of $SP_{tot}$(c0) and $SM_{Em}$, and the integral of the product of $SP_{tot}$(c0) and $SM_{Em}$, each integration spanning the visible spectral range from $\lambda_{min}$=380 nm to $\lambda_{max}$=780 nm. Now the value of c0 is varied, and with the varied division parameter again the combination spectrum and finally the distance dimension is calculated, with the aim to reduce the distance dimension and thus to bring the calculated combination spectrum closer to the measured emission spectrum. In particular, this approximation can be done iteratively, for example using a linear fit at each iteration step. The fitting or iteration can be terminated when the calculated distance dimension falls below a specified threshold, when the calculated distance dimension reaches a minimum, or even after a specified number of iterations.

In a second aspect, the invention relates to a method for producing a luminescent security marking on a substrate of a predetermined substrate type which comprises, in at least a part region thereof, a mixture of a diffuse reflectance printing ink and a luminescent printing ink applied to the substrate, and which exhibits visible luminescence having a luminescent spectrum on illumination with non-visible excitation light.

In the method, a mixture layer thickness is selected in a step WS'), and a diffuse reflectance printing ink and a luminescent printing ink are selected in a step WF').

In a step B'), a combination spectrum is determined as a luminescent spectrum of the luminescent printing ink modified by the diffuse reflectance spectrum $S_{Rem}$ of the diffuse reflectance printing ink.

In a step D'), a mixture of the selected diffuse reflectance printing ink and the selected luminescent printing ink is prepared, and the prepared mixture is printed with the selected mixture layer thickness on a substrate of the predetermined substrate type to obtain a luminescent security marking on the substrate whose luminescent spectrum in the part region on illumination with the non-visible excitation light matches the combination spectrum calculated in step B').

In an advantageous method, in step B') the combination spectrum $S_{tot}$ is calculated by means of the equation $$S_{tot}=S_{Lum} \times S_{Rem}$$

wherein $S_{Lum}$ is the luminescent spectrum of the luminescent printing ink and $S_{Rem}$ is the diffuse reflectance spectrum of the diffuse reflectance printing ink. This allows easy and accurate calculation of the combination spectrum.

In an advantageous embodiment, in step D') the mixture is prepared with equal proportions of the selected diffuse reflectance printing ink and the selected luminescent printing ink. Different proportions can be adjusted by diluting the diffuse reflectance and/or luminescent printing ink beforehand. Mixing in equal proportions makes it particularly easy to measure the diffuse reflectance spectrum and luminescent spectrum to be used.

Advantageously, in step B') the diffuse reflectance spectrum $S_{Rem}$ of the diffuse reflectance printing ink is determined by diluting the selected diffuse reflectance printing ink by mixing with the same amount of clear varnish,
producing a sample print with the diluted diffuse reflectance printing ink with the selected mixture layer thickness on a substrate of the predetermined substrate type,
measuring the diffuse reflectance spectrum of the sample print, and
using the measured diffuse reflectance spectrum of the sample print as the diffuse reflectance spectrum SRem.

In this way, a possible influence of a colored substrate can be taken into account.

Further, advantageously, in step B'), the luminescent spectrum $S_{Lum}$ of the luminescent printing ink is determined by diluting the selected luminescent printing ink by mixing with the same amount of clear varnish,
producing a sample print with the diluted luminescent printing ink having the selected mixture layer thickness on a substrate of the predetermined substrate type,
measuring the luminescent spectrum of the sample print on illumination with the non-visible excitation light, and
using the measured luminescent spectrum of the sample print as the luminescent spectrum $S_{Lum}$.

In this way, a possible influence of a colored substrate can be taken into account.

In both aspects of the invention, in an advantageous further development of the method in step WF), one or more different diffuse reflectance printing inks are diluted and/or mixed to select a diffuse reflectance printing ink. In this way, a variety of luminescent color impressions of the security marking can be produced.

Alternatively or additionally, in both aspects of the invention, one or more different luminescent printing inks may be diluted and/or mixed in step WF) or step WF') to select a luminescent printing ink. In this way, a variety of luminescent color impressions of the security marking can be produced.

In both aspects of the invention, a luminescent printing ink that is colorless and transparent under daylight is advantageously selected as the luminescent printing ink. A print of a colorless and transparent luminescent printing ink in the selected luminescent layer thickness essentially does not differ from the unprinted environment in terms of color impression under daylight, regardless of the color impression of the printed substrate. For example, the printed and unprinted regions can have a color difference of $\Delta E<1$.

In both aspects of the invention, an expected luminescent color impression of the part region of the luminescent security marking is advantageously determined from the combination spectrum. This allows the security marking to be integrated into a graphic design.

The invention also comprises a luminescent security marking on a substrate produced by a method of the type described.

The security marking comprises, at least in a part region, a layer sequence applied to the substrate or a mixture applied to the substrate.

The layer sequence or mixture includes a diffuse reflectance printing ink and a luminescent printing ink, wherein the luminescent printing ink is formed by a mixture of one or more luminescent base printing inks. The luminescent base printing inks are selected from a set of at least two luminescent base printing inks that span a base gamut in the CIEXYZ color space. The basic gamut of a set of three luminescent base printing inks, for example, is given by a color triangle whose vertices are formed by the color locations of the luminescent base printing inks.

In an advantageous embodiment, the part region of the security marking on illumination with non-visible excitation light, in particular on illumination exclusively with non-visible excitation light, has a color impression that lies outside the basic gamut of the set of luminescent base printing inks. This allows greater design freedom in the design of the security marking.

The luminescent printing ink is advantageously formed by a mixture of several, in particular two or three, of the luminescent base printing inks mentioned. This allows a wide range of color impressions of the luminescence of the luminescent printing ink.

It has proved particularly advantageous if the luminescent base printing inks mixed in the luminescent printing ink are matched to each other in terms of their stability and printing properties. In this way, the color impression of the luminescent printing ink is stable during processing and the life of the security feature.

In an advantageous further development, the security marking contains several part regions that have different color impressions on illumination with non-visible excitation light. This enables security marking with an attractive design and high recognition value.

Advantageously, different diffuse reflectance printing inks are present in each of the part regions mentioned, and the part regions exhibit different color impressions that lie outside the basic gamut on illumination with non-visible excitation light, in particular on illumination exclusively with non-visible excitation light. This allows a high degree of design freedom in the design of the security marking.

In the above part regions, the luminescent base printing inks mixed in the luminescent printing ink are preferably selected from the same set of luminescent base printing inks. This allows easy and efficient production of the security marking.

In a preferred embodiment, the luminescent security marking is printed on the data carrier as a security element for securing a data carrier, in particular a document of value or an identification document. In particular, the data carrier can be a document of value, such as a banknote, in particular a paper banknote, a polymer banknote or a foil composite banknote, a share, a bond, a certificate, a voucher, a check, a seal, a tax band, a high-value admission ticket, but also an identification card, such as a credit card, a bank card, a cash card, an authorization card, an ID card or a passport personalization page.

BRIEF DESCRIPTION OF THE DRAWINGS

Further exemplary embodiments as well as advantages of the invention are explained below with reference to the figures, which have not been reproduced to scale or proportion in order to increase clarity.

They show:

FIG. 1, including FIGS. 1(a) and 1(b), a schematic representation of a banknote with a luminescent security marking according to the invention, showing 1(a) the appearance in visible light, and 1(b) the appearance on illumination with non-visible excitation light, FIG. 2 a schematic cross-section of the security marking of FIG. 1, FIG. 3 a CIE-xy color chart showing the color triangles of the color locations achievable with three luminescent pigments or with a combination of the luminescent pigments with a blue diffuse reflectance printing ink, FIG. 4, including FIGS. 4(a) to 4(c), a diagram like FIG. 3 illustrating the color locations achievable with a combination of the three luminescent pigments with a 4(a) yellow, 4 (b) green and 4(c) red diffuse reflectance printing ink, FIG. 5 a chart of the luminescent spectra of the luminescent pigments used for the primary colors red, green and blue, FIG. 6 a chart of the diffuse reflectance spectra of the pantone colors used for blue, yellow, green and red, FIG. 7, including FIGS. 7(a) and 7(b), a comparison of the measured emission spectrum of a sample print of a combination of a sample diffuse reflectance printing ink and a sample luminescent printing ink with a calculated combination spectrum, in 7(a) with an initial value c0=1 for the division parameter and in 7(b) with the determined optimal division parameter c=0.94, FIG. 8, including FIGS. 8(a) to 8(c), respectively, for a different combination of a diffuse reflectance printing ink and a luminescent printing ink, a comparison of the measured emission spectrum with the combination spectrum predicted using the division parameter of FIG. 7(b), FIG. 9 a schematic cross-section of a security marking according to the invention with a mixture layer, and FIG. 10 the appearance of a luminescent security marking on a substrate according to the invention on illumination with UV excitation light.

DETAILED DESCRIPTION OF VARIOUS EMBODIMENTS

Figure 5:
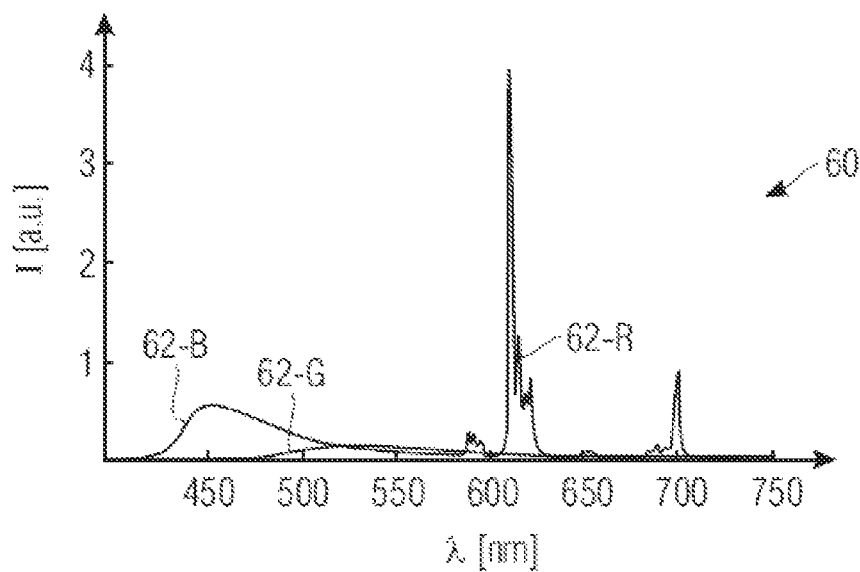

The invention will now be explained using the example of a luminescent security marking for banknotes. FIG. 1 shows a schematic representation of a banknote 10 with a paper substrate 12 and a luminescent security marking 14 printed on the paper substrate. In visible light, the security marking 14 has a first appearance and, in the simplest case, shows a homogeneous monochromatic surface, such as illustrated in FIG. 1(a).

After excitation with non-visible excitation light, for example UV light 16, the security marking 14 luminesces, showing a second appearance, for example a multicolored luminescent motif that has different color impressions in different part regions, as illustrated in FIG. 1(b). As a special feature, the color locations of the color impressions originate at least in part specifically from those regions of the standard color chart that lie outside the gamut achievable by mixing the luminescent pigments used.

The procedure for producing the luminescent security marking 14 on the predetermined paper substrate 12 is explained in more detail with reference to FIG. 2, which schematically shows a cross-section of the security marking 14 in a part regions of the marking.

In the depicted part region 18, a layer sequence 20 is applied to the paper substrate 12, comprising a first layer 22 of a blue diffuse reflectance printing ink printed on the paper substrate 12 and a second layer 24 of a luminescent printing ink transparent in the visible spectral range printed on the diffuse reflectance layer 22. The luminescent printing ink typically contains three luminescent pigments 26 for the primary colors red, green and blue in a certain proportion in a clear varnish 28, so that the luminescent printing ink alone emits luminescent radiation with a certain luminescent spectrum given by the relative proportion of the luminescent pigments after exposure to non-visible excitation light. In FIG. 2, only one type of luminescent pigment 26 is shown for ease of illustration.

The color location of the luminescence of the luminescent printing ink used can be indicated in the CIE-xy color chart 30 shown in FIG. 3. Here, the spectral color procession 32 includes all color impressions perceptible to the human eye, given by hue and saturation for a given brightness. The colors on the spectral color procession 32 show maximum saturation, at the white point W the colors are completely desaturated.

The color locations achievable by mixing the three luminescent pigments for the primary colors red, green and blue lie within a color triangle 34, the corner points of which are formed by the color locations 34-R, 34-G, 34-B of the three primary colors red, green and blue of the luminescent pigments 26. The color triangle 34 therefore represents the gamut of the portion of the color space achievable with the three luminescent pigments. The specific color location of the luminescence of the luminescent printing ink of FIG. 2 with the specific mixing proportions of the three luminescent pigments is indicated in FIG. 3 with reference sign 36.

Also indicated in FIG. 3 is the color location 38 of the luminescence of the security marking in part region 18, and it can be seen that color location 38 is well outside color triangle 34 and therefore cannot be achieved with a simple combination of the three red, green and blue luminescent pigments 26.

Returning to the illustration of FIG. 2 for explanation, the color location 38 of the luminescence in the part region 18, which lies outside the color triangle 34, is achieved by the luminescent layer 24 being applied to a colored diffuse reflectance layer, namely the diffuse reflectance layer 22 made of the blue diffuse reflectance printing ink, which shifts its color location with its body color by diffuse reflectance of the emitted luminescent radiation.

More specifically, the incident UV radiation 16 excites the luminescent pigments 26 present in the clear varnish 28 of the luminescent printing ink to emit 40 in all spatial directions. A part 42 of the radiation is emitted in the direction of the free surface without being influenced by the diffuse reflectance layer, another part 44 is emitted in the direction of the blue diffuse reflectance layer 22 and is reemitted from it with a change in color. The unaffected, direct emission 42 and the color-altered, reemitted emission 46 together produce essentially the total spectrum 48 and thus the overall color impression of the security marking 14 in part region 18. In addition to direct single diffuse reflectance of the emitted luminescent radiation, there are also higher order effects in which multiple reflections occur within the substrate 12/diffuse reflectance layer 22/luminescent layer 24 system, and these are not shown in the simplified illustration of FIG. 2.

While the color location of the direct emission 42 of the luminescent printing ink is limited to the color triangle 34 of FIG. 3, by combining the luminescent printing ink with the diffuse reflectance printing ink, color locations of the total spectrum 48 outside of the color triangle 34 can be achieved by influencing the luminescent emission of the latter. Specifically, the blue diffuse reflectance printing ink used in the diffuse reflectance layer 22 can reach all of the color locations in the modified color triangle 50 (FIG. 3), so that a greater number of color impressions can be produced in the blue portion of the color chart.

For the production of a luminescent security marking, it is often desirable or even necessary to be able to adjust the color location of the luminescence in the various part regions of the marking according to specifications. In principle, the total spectrum of a layer sequence 20 consisting of a diffuse reflectance layer 22 and a luminescent layer 24 can be modeled using Kubelka-Munk theory, in which infinitesimally thin slices of the layer sequence are considered and the resulting system of differential equations is solved. However, this procedure requires a large number of complex measurements of diffuse reflectance spectra of the diffuse reflectance printing ink used and of emission spectra of the luminescent printing ink used in different layer thicknesses in each case, as well as the mathematically complex solution of the resulting system of differential equations.

Provided herein is a much simpler, yet reliable, method for modeling the layer sequence 20 on the substrate 12 that allows a luminescent security marking to be produced with a desired color effect of its part regions on a substrate.

The proposed method is based on division of the total spectrum 48 of the layer sequence 20 in part region 18 into a first portion of direct emission 42 from the luminescent layer 24 and a second portion of emission 46 simply reemitted from the diffuse reflectance layer 22, neglecting multiple reflections. More precisely, the division of the total spectrum 48 into the two portions 42, 46 is done by parameterizing the division ratio with a division parameter c.

If $S_{Lum}$ denotes the luminescent spectrum of the luminescent layer 24 and $S_{Rem}$ denotes the diffuse reflectance spectrum of the diffuse reflectance layer 22, the total spectrum $S_{tot}$ of the layer sequence 20 can be calculated by this equation:

$$S_{tot} = c \times S_{Lum} \times S_{Rem} + (1-c) \times S_{Lum}.$$

It has been shown that the division parameter c, in particular, can be selected to depend only on the substrate type of the predetermined substrate 12 and the layer thicknesses of the diffuse reflectance layer 22 and the luminescent layer 24, but not on the selected luminescent printing ink and the selected diffuse reflectance printing ink. This has the great advantage that the division parameter c can be determined once for a combination of a sample luminescent printing ink with a sample diffuse reflectance printing ink and subsequently used for a large number of printing ink combinations. Despite the thus low measurement and calculation effort, the predicted spectra show a high agreement with the actually measured total spectra. Time-consuming and labor-intensive modeling of the layer sequence 20 with the Kubelka-Munk theory can therefore be omitted.

FIG. 3 shows with the color triangle 50 the gamut of color locations that can be achieved by combining the three luminescent pigments 26 with a concrete blue diffuse reflectance printing ink. Analogous considerations can be made for combinations of the three luminescent pigments 26 with other background colors that can be used to produce other extensions of the initial gamut 34.

As exemplary embodiments, FIG. 4 shows in (a) the color triangle 52 of the color locations that can be achieved by combining the three luminescent pigments 26 with a yellow diffuse reflectance printing ink, in (b) the color triangle 54 of the color locations that can be achieved by combining the three luminescent pigments 26 with a green diffuse reflectance printing ink, and in (c) the color triangle 56 of the color locations that can be achieved by combining the three luminescent pigments 26 with a red diffuse reflectance printing ink. In all charts, the initial color triangle 34 of the colors that can be represented with the three luminescent pigments 26 alone is shown in each case with narrow hatching. For the modified color triangles 50, 52, 54, 56, Pantone colors for blue, yellow, green and red were used as diffuse reflectance printing inks, and a division parameter c=0.94 was considered for the selected layer thicknesses.

As can be seen from FIGS. 3 and 4, the gamut of available color locations can be significantly expanded by combining the three luminescent pigments 26 with different diffuse reflectance printing inks in different part regions of a security marking without the need for costly development of new luminescent base printing inks. Instead, a variety of already known and inexpensive diffuse reflectance printing inks can be used for gamut expansion. At the same time, the method described allows the color location of a combined layer sequence of diffuse reflectance printing ink and luminescent printing ink to be determined in advance in a simple and reliable manner.

Figure 6:
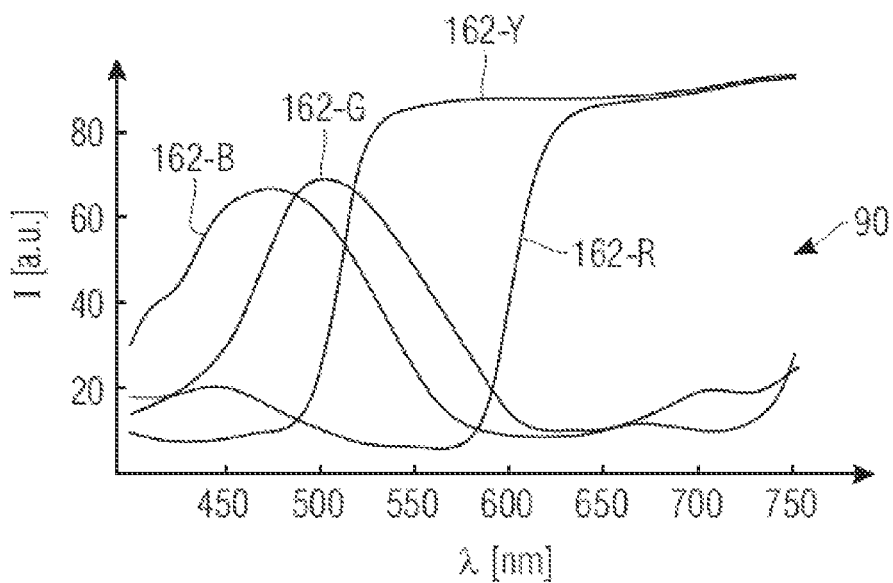

Chart 60 of FIG. 5 shows the luminescent spectra 62-R, 62-G, 62-B of the luminescent pigments for the primary colors red, green and blue, which in the above description serve as the basis for mixing the specific desired luminescent printing ink. The luminescent spectra 62-R, 62-G, 62-B were each measured on sample prints with an application thickness of 3 g/m2 at 10% pigmentation. The color locations of these luminescent primary colors are shown in the standard color chart of FIG. 3 as corner points 34-R, 34-G, 34-B of the color triangle 34. Chart 90 of FIG. 6 shows measured diffuse reflectance spectra 162-B, 162-G, 162-Y and 162-R of the above-mentioned pantone colors for blue, green, yellow and red.

As mentioned above, the division parameter c can be determined based on a specific combination of a sample diffuse reflectance printing ink and a sample luminescent printing ink, and then used for combinations of any diffuse reflectance and luminescent printing inks of the same layer thickness. Specifically, this can be done, for example, as follows.

First, as a sample diffuse reflectance printing ink, for example, the pantone color for yellow is selected, and as a sample luminescent printing ink, for example, the blue-emitting luminescent printing ink of FIG. 5 is selected. Then, a first sample print is produced on a substrate of the predetermined substrate type, for example, a cotton velin paper with the selected sample diffuse reflectance printing ink with a selected diffuse reflectance layer thickness, and the diffuse reflectance spectrum of the first sample print is measured (FIG. 6, diffuse reflectance spectrum 162-Y).

In addition, a second sample print is produced on the selected cotton velin paper with the selected sample luminescent printing ink in the desired luminescent layer thickness, and the luminescent spectrum of the second sample print is measured on pure excitation illumination (FIG. 5, luminescent spectrum 62-B).

Then a third sample print is produced on the selected cotton velin paper, in which the selected sample diffuse reflectance printing ink with the selected diffuse reflectance layer thickness and the selected sample luminescent printing ink with the selected luminescent layer thickness are printed on the substrate one above the other. The measured emission spectrum 102 of the third sample print on pure excitation illumination is shown in the chart 100 of FIGS. 7(*a*) and 7(*b*).

To determine the division parameter c, an arbitrary initial value c0 is first selected, and a sample combination spectrum is calculated using this initial value by weighted addition of the measured luminescent spectrum 62-B modified by the measured diffuse reflectance spectrum 162-Y and the unmodified measured luminescent spectrum 62-B. In the exemplary embodiment, an initial value of c0=1 was selected, and the sample combination spectrum 104 calculated from this is also shown in FIG. 7(*a*).

As can be seen from the figure, the sample combination spectrum 104 shows poor agreement with the measured emission spectrum 102. To quantify the deviation of the two spectra, a distance dimension is calculated between the calculated sample combination spectrum 104 and the measured emission spectrum 102, for example, the root of the summed squared deviations for all spectral points can be used as the distance dimension. In the exemplary embodiment, using this distance dimension results in a deviation of the spectra of $\lambda(c0=1)=2.18$.

Now the value of c0 is varied, and with the varied division parameter again a sample combination spectrum and finally the distance dimension $\lambda(c)$ is calculated to lower the distance dimension as much as possible and to get a better fit to the measured emission spectrum 102. The optimal value for the parameter c can be determined, for example, by methods of the calculus of variations known per se. In the exemplary embodiment, an optimal value c=0.94 was determined in this way, resulting in a distance dimension $\lambda(c=0.94)=0.75$. The associated sample combination spectrum 106 is shown in FIG. 7(*b*) and now shows good agreement between the calculated spectrum 106 and the measured spectrum 102.

The division parameter c does not depend on the selected diffuse reflectance printing ink and the selected luminescent printing ink, so that the division parameter c=0.94 determined with the aid of the two sample printing inks can be used universally in practice for any printing layer combinations with the layer thicknesses selected for the sample print on the same substrate.

To illustrate this surprising result, chart 110 of FIG. 8(*a*) shows two spectra for a combination of a blue-emitting luminescent printing ink (FIG. 5, luminescent spectrum 62-B) with a green diffuse reflectance printing ink (FIG. 6, diffuse reflectance spectrum 162-G), namely on the one hand the measured emission spectrum 112 and on the other hand the combination spectrum 114 predicted with the division parameter c=0.94. As can be seen from the figure, the two spectra show very good agreement with a distance dimension of $\lambda(c=0.94)=0.37$.

Chart 120 of FIG. 8(*b*) shows two spectra for a combination of a green-emitting luminescent printing ink (FIG. 5, luminescent spectrum 62-G) with a yellow diffuse reflectance printing ink (FIG. 6, diffuse reflectance spectrum 162-Y), namely on the one hand the measured emission spectrum 122 and on the other hand the combination spectrum 124 predicted with the division parameter c=0.94. As can be seen from the figure, the two spectra show very good agreement with a distance dimension of $\lambda(c=0.94)=0.32$.

Finally, chart 130 of FIG. 8(*c*) shows two spectra for a combination of a red-emitting luminescent printing ink (FIG. 5, luminescent spectrum 62-R) with a green diffuse reflectance printing ink (FIG. 6, diffuse reflectance spectrum 162-G), namely, on the one hand, the measured emission spectrum 132 and, on the other hand, the combination spectrum 134 predicted with the division parameter c=0.94. As can be seen from the figure, the two spectra show very good agreement with a distance dimension of $\lambda(c=0.94)=0.18$.

The charts of FIG. 8 illustrate that the uniquely determined division parameter c is also very well suited for calculating the combination spectra of other print layer combinations in advance and thus determining their color impression.

The luminescent security markings described so far were produced by overprinting a diffuse reflectance printing ink with a luminescent printing ink that is colorless and transparent in the visible spectral range. However, it is also possible to combine a diffuse reflectance printing ink with a luminescent printing ink that exhibits a body color under daylight. Also in such a case, the determination of the total spectrum can be performed as described above, since the measured luminescent spectrum already contains the effects of the body color of the luminescent printing ink. However, the division parameter c depends on the interaction of the body color and the luminescence of the luminescent printing ink, so the calculation may be less accurate.

Furthermore, instead of two layers printed on top of each other, a mixture of a diffuse reflectance printing ink with a luminescent printing ink that is colorless and transparent under daylight can also be produced and this mixture printed on in a part region of the marking.

Figure 9:
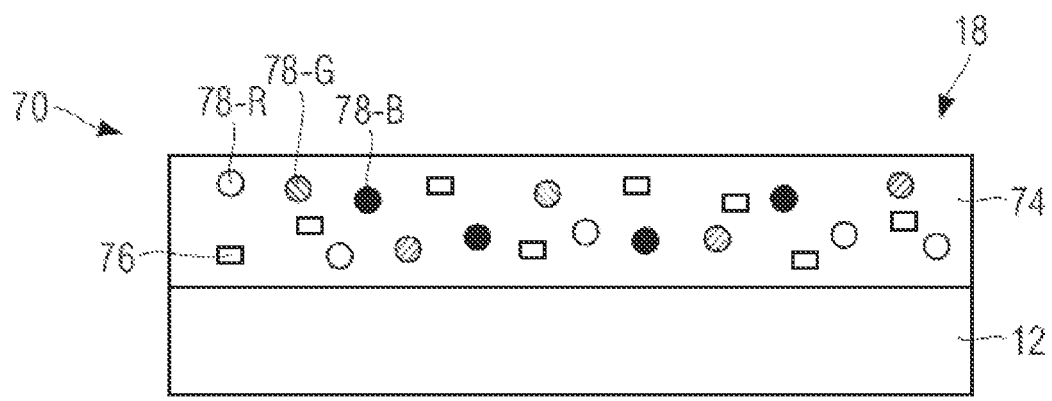
Figure 10:
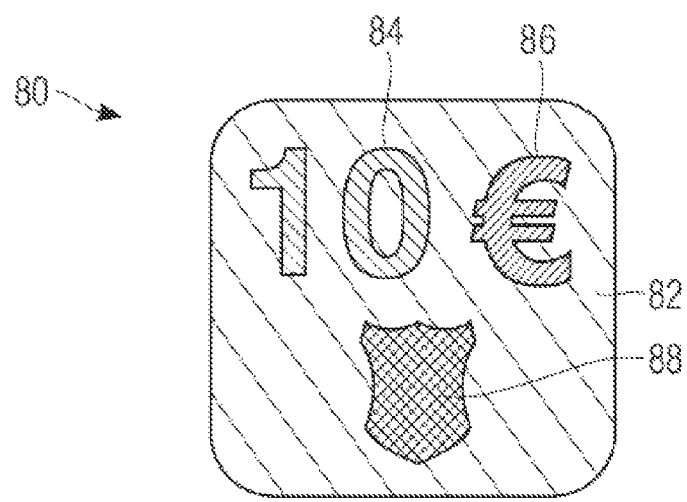

In this regard, FIG. 9 shows a part region 18 of a luminescent security marking 70 according to another exemplary embodiment of the invention, in which a mixture layer 72 of a mixture of a diffuse reflectance printing ink and a luminescent printing ink is printed on a predetermined substrate 12, for example the paper substrate of a bank bill. The diffuse reflectance printing ink is formed by a mixture of a clear varnish 74 with diffuse reflectance color pigments 76, while the luminescent printing ink is formed by a mixture of a clear varnish 74 with, for example, up to three luminescent pigments 78-R, 78-G, 78-B with emission in the luminescent base colors. For example, the luminescent primary colors red, green, blue with the spectra shown in FIG. 5 can be used as luminescent primary colors. Thus, the mixture layer 72 has both diffuse reflectance color pigments 76, and luminescent pigments 78-R, 78-G, 78-B in the clear varnish 74.

The general equation given above for the total spectrum Stot can also be used for the mixture layer 72 of FIG. 9, but in this case the division parameter c is always equal to 1, so that the total spectrum of the mixture layer is given by $$S_{tot} = S_{Lum} \times S_{Rem}$$

Correct measurement of the $S_{Rem}$ diffuse reflectance spectra and the $S_{Lum}$ luminescent spectra allows any mixing ratios of the diffuse reflectance printing ink and the luminescent printing ink to be taken into account. For example, the diffuse reflectance spectrum $S_{Rem}$ is measured on a printing ink that contains the same concentration of the diffuse reflectance color pigment as the mixed printing ink, but does not contain any admixture of the luminescent pigments 78-R, 78-G, 78-B. Accordingly, the luminescent spectrum $S_{Lum}$ is measured on a printing ink containing the same concentration of the luminescent color pigments 78-R, 78-G, 78-B as the mixed printing ink, but containing no admixture of the diffuse reflectance color pigment.

A mixture of a diffuse reflectance printing ink and a luminescent printing ink can be produced, for example, by incorporating powdered ink or luminescent pigments together in a clear varnish, or by mixing liquid printing inks together.

Even in the case of a mixture, the proposed method allows reliable prediction of the emission spectrum with little effort.

Luminescent security markings can also contain several part regions, each of which is produced using the procedure described. In particular, luminescent security markings with a particularly large gamut can thus be produced. By way of illustration, FIG. 107 shows the appearance of a luminescent security marking 80 on a substrate on illumination with UV excitation light. The part regions 82, 84, 86 and 88 each show different color impressions in luminescence.

In each of the part regions 82-88, there is a layer sequence of a diffuse reflectance printing ink and a luminescent printing ink, the luminescent printing ink of all part regions being formed by a mixture of the same three luminescent base printing inks, specifically approximately the luminescent base printing inks of FIGS. 3 through 5. However, the relative proportion of luminescent base printing inks is generally different in part regions 82-88. The relative proportion of one or two luminescent base printing inks can also be zero, so that the luminescent printing ink in such a part region contains only two or only one luminescent base printing ink.

The luminescent color print of at least a part region 82-88 advantageously lies outside the basic gamut 34 spanned in the CIEXYZ color space by the three luminescent basic colors.

In one embodiment, the same diffuse reflectance printing ink is present in each of the part regions 82-88. In this case, if the luminescent printing inks are transparent and colorless under daylight, the security marking has a homogeneous appearance in visible light, and the characters and patterns formed by part regions 82-88 only appear after excitation with non-visible excitation light.

In another embodiment, different diffuse reflectance printing inks are present in at least some of the part regions 82-88, and the security marking 80 then advantageously includes a plurality of part regions each having different color impressions outside of the base gamut 34 on illumination with non-visible excitation light. For example, part region 84 may have luminescence with color location 94 (FIG. 3), part region 82 may have luminescence with color location 92 (FIG. 4(a)), part region 86 may have luminescence with color location 96 (FIG. 4(b)), part region 88 may have luminescence with color location 98 (FIG. 4(c)). After excitation, the security marking 80 then luminesces with a blue value numeral 84, a green € symbol 86, and a red coat of arms 88 against a yellow background 82, with all luminescent color impressions having high saturation and being outside the base gamut 34.

The regions with different diffuse reflectance printing inks can be congruent with the part regions 82-88, so that the depicted characters and patterns can also be recognized in visible light due to the different color impressions of the diffuse reflectance printing inks. However, it is also possible for the regions with different diffuse reflectance printing inks to be formed larger, but with a different shape than the part regions 82-88 provided with luminescent printing inks. In this case, the security marking 80 may exhibit first characters and patterns in visible light, and second, different characters and patterns on illumination with non-visible excitation light.

The invention claimed is:

1. A method for producing a luminescent security marking on a substrate of a predetermined substrate type, the marking comprising, in a part region thereof, a layer sequence applied to the substrate, the layer sequence being formed from a diffuse reflectance printing ink applied to the substrate and a luminescent printing ink applied to the diffuse reflectance printing ink and which exhibits visible luminescence with a luminescent spectrum on illumination with non-visible excitation light, the method comprising:
   WS) selecting a diffuse reflectance layer thickness and a luminescent layer thickness,
   WF) selecting a diffuse reflectance printing ink and a luminescent printing ink,
   C) providing a division parameter c from the interval [0,1], the value of which depends on the predetermined substrate type, the selected diffuse reflectance layer thickness and the selected luminescent layer thickness,
   B) determining a combination spectrum by an addition, weighted by the provided division parameter c, of the luminescent spectrum of the luminescent printing ink modified by the diffuse reflectance spectrum $S_{Rem}$ of the diffuse reflectance printing ink and the unmodified luminescent spectrum $S_{Lum}$ of the luminescent printing ink,
   D) printing the selected diffuse reflectance printing ink at the selected diffuse reflectance layer thickness and the selected luminescent printing ink at the selected luminescent layer thickness on a substrate of the predetermined substrate type to obtain a luminescent security marking on the substrate whose luminescent spectrum in the part region on illumination with the non-visible excitation light matches the combination spectrum calculated in step B).

2. The method according to claim 1, wherein in step B) the combination spectrum $S_{tot}$ is calculated by means of the equation $$S_{tot} = c \times S_{Lum} \times S_{Rem} + (1-c) \times S_{Lum},$$

wherein c is the division parameter, $S_{Lum}$ is the luminescent spectrum of the luminescent printing ink, and $S_{Rem}$ is the diffuse reflectance spectrum of the diffuse reflectance printing ink, and wherein the term $S_{Lum} \times S_{Rem}$ represents the luminescent spectrum of the luminescent printing ink modified by the diffuse reflectance spectrum $S_{Rem}$ of the diffuse reflectance printing ink, and the term $S_{Lum}$ represents the unmodified luminescent spectrum of the luminescent printing ink.

3. The method according to claim 1, wherein in step B) the diffuse reflectance spectrum $S_{Rem}$ of the diffuse reflectance printing ink is determined by producing a sample print with the selected diffuse reflectance printing ink with the selected diffuse reflectance layer thickness, measuring the diffuse reflectance spectrum of the sample print, and using the measured diffuse reflectance spectrum of the sample print as the diffuse reflectance spectrum $S_{Rem}$.

4. The method according to claim 1, wherein in step B) the luminescent spectrum $S_{Lum}$ of the luminescent printing ink is determined by producing a sample print with the selected luminescent printing ink with the selected luminescent layer thickness, measuring the luminescent spectrum of the sample print on illumination with the excitation light, and using the measured luminescent spectrum of the sample print as the luminescent spectrum $S_{Lum}$.

5. The method according to claim 1, wherein in step C) a division parameter is provided, the value of which depends only on the predetermined substrate, the selected diffuse reflectance layer thickness and the selected luminescent layer thickness, but not on the selected diffuse reflectance printing ink and the selected luminescent printing ink.

6. The method according to claim 1, wherein in step C) the division parameter c is provided by C1) selecting a sample diffuse reflectance printing ink and a sample luminescent printing ink, C2) producing a first sample print on a substrate of the predetermined substrate type with the selected sample diffuse reflectance printing ink with the selected diffuse reflectance layer thickness, C3) measuring the diffuse reflectance spectrum of the first sample print, C4) producing a second sample print on a substrate of the predetermined substrate type with the selected sample luminescent printing ink with the selected luminescent layer thickness, C5) measuring the luminescent spectrum of the second sample print on illumination with the non-visible excitation light, C6) producing a third sample print on a substrate of the predetermined substrate type, in which the selected sample diffuse reflectance printing ink having the selected diffuse reflectance layer thickness is printed on the substrate, the selected sample diffuse reflectance printing ink having the selected luminescent layer thickness is printed on the sample luminescent printing ink, C7) measuring the emission spectrum of the third sample print on illumination with the non-visible excitation light, and C8) determining the division parameter c using the measured diffuse reflectance spectrum of the first sample print, the measured luminescent spectrum of the second sample print and the measured emission spectrum of the third sample print.

7. The method according to claim 1, wherein in step C8) the division parameter c is determined by C8a) calculating a sample combination spectrum assuming an initial value for the division parameter by weighted addition of the measured luminescent spectrum modified by the measured diffuse reflectance spectrum and the unmodified measured luminescent spectrum and comparing it with the measured emission spectrum, and C8b) adjusting the initial value of the division parameter c, if necessary several times, in such a way that the calculated sample combination spectrum has the best possible agreement with the measured emission spectrum.

8. The method according to claim 7, wherein the sample combination spectrum $SP_{tot}$ is calculated by means of the equation $$SP_{tot} = c0 \times SM_{Lum} \times SM_{Rem} + (1-c0) \times SM_{Lum},$$

wherein c0 represents the initial value or an adjusted initial value for the division parameter, $SM_{Lum}$ represents the measured luminescent spectrum, and $SM_{Rem}$ represents the measured diffuse reflectance spectrum.

9. The method according to claim 7, wherein, for the comparison of the combination spectrum with the measured emission spectrum, a distance dimension between the calculated sample combination spectrum $SP_{tot}$ and the measured emission spectrum $SM_{Em}$ is calculated, for example the difference between the product of the integrals of $SP_{tot}$ and $SM_{Em}$, and the integral of the product of $SP_{tot}$ and $SM_{Em}$, and the initial value c0 for determining the division parameter c is, if necessary, adjusted several times such that the calculated distance dimension is minimized.

10. A method for producing a luminescent security marking on a substrate of a predetermined substrate type which comprises in a part region thereof a mixture of a diffuse reflectance printing ink and a luminescent printing ink applied to the substrate and which exhibits visible luminescence with a luminescent spectrum on illumination with non-visible excitation light, the method comprising:

WS') selecting a mixture layer thickness,

WF') selecting a diffuse reflectance printing ink and a luminescent printing ink, B') determining a combination spectrum as a luminescent spectrum of the luminescent printing ink modified by the diffuse reflectance spectrum SRem of the diffuse reflectance printing ink, D') preparing a mixture of the selected diffuse reflectance printing ink and the selected luminescent printing ink, and printing the prepared mixture with the selected mixture layer thickness on a substrate of the predetermined substrate type to obtain a luminescent security marking on the substrate, the luminescent spectrum of which in the part region on illumination with the non-visible excitation light coincides with the combination spectrum calculated in step B').

11. The method according to claim 10, wherein in step B') the combination spectrum $S_{tot}$ is calculated by means of the equation $$S_{tot} = S_{Lum} \times S_{Rem},$$

wherein $S_{Lum}$ is the luminescent spectrum of the luminescent printing ink and $S_{Rem}$ is the diffuse reflectance spectrum of the diffuse reflectance printing ink.

12. The method according to claim 10, wherein in step B') the diffuse reflectance spectrum $S_{Rem}$ of the diffuse reflectance printing ink is determined by diluting the selected diffuse reflectance printing ink by mixing with the same amount of clear varnish, producing a sample print with the diluted diffuse reflectance printing ink with the selected mixture layer thickness, measuring the diffuse reflectance spectrum of the sample print, and using the measured diffuse reflectance spectrum of the sample print as the diffuse reflectance spectrum $S_{Rem}$.

13. The method according to claim 10, wherein in step B') the luminescent spectrum $S_{Lum}$ of the luminescent printing ink is determined by diluting the selected luminescent printing ink by mixing with the same amount of clear varnish, producing a sample print with the diluted luminescent printing ink having the selected mixture layer thickness, measuring the luminescent spectrum of the sample print on illumination with the non-visible excitation light, and using the measured luminescent spectrum of the sample print as the luminescent spectrum $S_{Lum}$.

14. The method according to claim 10, wherein in step D') the mixture is prepared with equal proportions of the selected diffuse reflectance printing ink and the selected luminescent printing ink.

15. The method according to claim 1, wherein in step WF) or in step (WF') several different diffuse reflectance printing inks are diluted and/or mixed for the selection of a diffuse reflectance printing ink.

16. The method according to claim 1, wherein in step WF) or in step (WF') several different luminescent printing inks are diluted and/or mixed to select a luminescent printing ink.

17. The method according to claim 1, wherein an expected luminescent color impression of the part region of the luminescent security marking is determined from the combination spectrum.

* * * * *